(12) United States Patent
McManus et al.

(10) Patent No.: US 10,728,468 B2
(45) Date of Patent: Jul. 28, 2020

(54) ACTIVITY AND/OR ENVIRONMENT DRIVEN ANNOTATION PROMPTS FOR THERMAL IMAGER

(71) Applicant: Fluke Corporation, Everett, WA (US)

(72) Inventors: Thomas J. McManus, Plymouth, MN (US); Matthew F. Schmidt, River Falls, WI (US)

(73) Assignee: Fluke Corporation, Everett, WA (US)

( * ) Notice: Subject to any disclaimer, the term of this patent is extended or adjusted under 35 U.S.C. 154(b) by 865 days.

(21) Appl. No.: 13/944,642

(22) Filed: Jul. 17, 2013

(65) Prior Publication Data

US 2015/0022667 A1 Jan. 22, 2015

(51) Int. Cl.
*H04N 5/33* (2006.01)
*H04N 5/232* (2006.01)

(52) U.S. Cl.
CPC .......... *H04N 5/33* (2013.01); *H04N 5/23216* (2013.01); *H04N 5/23222* (2013.01); *H04N 5/23293* (2013.01)

(58) Field of Classification Search
CPC .......... H04N 5/23216; H04N 5/23222; H04N 5/23293; H04N 5/33
See application file for complete search history.

(56) References Cited

U.S. PATENT DOCUMENTS

| | | | |
|---|---|---|---|
| 5,386,117 A | 1/1995 | Piety et al. | |
| 5,637,871 A | 6/1997 | Piety et al. | |
| 5,724,242 A * | 3/1998 | Moore-Mckee | F02D 41/26 123/27 GE |
| 5,949,418 A * | 9/1999 | Shields | G06F 3/0481 715/795 |
| 6,849,849 B1 | 2/2005 | Warner et al. | |
| 7,332,716 B2 | 2/2008 | Hamrelius et al. | |
| 7,454,050 B2 | 11/2008 | Garvey | |
| 7,528,372 B2 | 5/2009 | Garvey, III et al. | |
| 7,535,002 B2 * | 5/2009 | Johnson | G01J 5/02 250/332 |

(Continued)

FOREIGN PATENT DOCUMENTS

| | | |
|---|---|---|
| CN | 1901629 A | 1/2007 |
| EP | 1028313 A2 | 8/2000 |

(Continued)

OTHER PUBLICATIONS

Extended European Search Report for EP Application No. 14177348.1, dated Jan. 28, 2015, 8 pages.

(Continued)

*Primary Examiner* — Peter D Le
(74) *Attorney, Agent, or Firm* — Fredrikson & Byron, P.A.

(57) ABSTRACT

A thermal imaging camera comprises an infrared lens assembly and associated IR sensor for detecting thermal images of a target scene, a processor, and at least one additional sensor. The at least one additional sensor is configured to provide measurement data to the processor, where it is compared to a predetermined requirement. If the measurement data satisfies the predetermined requirement, the camera will prompt the user via a display. During use, the camera can prompt the user to provide annotation data, conduct a thermographic inspection, inspect the target scene, or perform other tasks based on the measurement data.

27 Claims, 8 Drawing Sheets

(56) References Cited

U.S. PATENT DOCUMENTS

| | | | |
|---|---|---|---|
| 7,732,768 B1* | 6/2010 | Haigh | G01J 5/02 250/330 |
| 8,212,211 B2* | 7/2012 | Drews | A62B 3/00 250/330 |
| 2004/0023612 A1* | 2/2004 | Kriesel | A01K 11/008 452/157 |
| 2004/0143602 A1* | 7/2004 | Ruiz | H04N 7/181 |
| 2004/0160340 A1* | 8/2004 | Thomson | B64D 45/0015 340/945 |
| 2007/0174152 A1* | 7/2007 | Bjornberg | G06Q 10/087 705/28 |
| 2008/0099678 A1* | 5/2008 | Johnson | G01J 5/02 250/332 |
| 2008/0183049 A1* | 7/2008 | Karkanias et al. | 608/301 |
| 2009/0086032 A1 | 4/2009 | Li | |
| 2009/0184244 A1* | 7/2009 | Drews | A62B 3/00 250/330 |
| 2010/0205553 A1* | 8/2010 | Haigh | G01J 5/02 715/769 |
| 2010/0309315 A1* | 12/2010 | Hogasten | H04N 5/33 348/164 |
| 2011/0311026 A1* | 12/2011 | Lalena | A61B 6/4405 378/98.5 |
| 2012/0001768 A1* | 1/2012 | Radosavljevic | H04Q 9/00 340/870.03 |
| 2012/0242809 A1* | 9/2012 | White | G08G 1/0175 348/51 |
| 2013/0307992 A1 | 11/2013 | Erlandsson | |
| 2013/0335550 A1* | 12/2013 | Rochenski | G08B 17/125 348/82 |
| 2014/0013201 A1 | 1/2014 | Erlandsson | |

FOREIGN PATENT DOCUMENTS

| | | |
|---|---|---|
| EP | 2495674 A1 | 5/2012 |
| EP | 2608528 A1 | 6/2013 |
| WO | 94/29701 | 12/1994 |
| WO | 2009008778 A1 | 1/2009 |
| WO | 2012116112 A1 | 8/2012 |

OTHER PUBLICATIONS

Extech EX845 User's Guide, Extech Instruments Corporation (a FLIR company), 2012, p. 10.

Extech MO297 User's Guide, FLIR Systems, Inc., 2013, p. 8.

FLIR Exx Series User's Manual, FLIR Systems, Inc., Nov. 7, 2011, pp. 56-61.

FLUKE IR FlexCam Thermal Imagers Users Manual, Fluke Corporation, Jan. 2007, Rev. 2, 5/09, pp. 4-9 to 4-12.

* cited by examiner

ACTIVITY AND/OR ENVIRONMENT DRIVEN ANNOTATION PROMPTS FOR THERMAL IMAGER

BACKGROUND

Thermal imaging cameras are used to observe temperature variations in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Thermal imaging cameras include sensors for detecting infrared energy in a scene being viewed by the camera. An example of such a sensor is a focal plane array (FPA) which generates an electrical signal in response to infrared energy received through the camera lens. The FPA includes sensor elements, such as bolometers or photon detectors, and each such sensor element may be referred to as a sensor pixel. The electrical resistance or voltage of the sensor pixels changes in response to infrared energy and can therefore be used to generate a thermal image or thermogram.

Infrared images are often "annotated" with additional information that is either provided by the user or known by the camera (e.g. date/time, location, calibration range, emissivity setting, etc.). Often, the user will forget to input the appropriate information and will either have to edit the image/annotation data later (i.e., to correct it or add to it well after the image is captured) or just use the image without any annotation. This could prove troublesome if an unannotated thermal image is recalled for reference some significant amount of time after capture. It is possible that, without annotations, important details of the image may be uncertain or completely forgotten. Moreover, to the extent that something in the environment and/or "use context" has changed during the image capture process, the user may not be able to later recall sufficient information needed to annotate the image with the change in use context.

SUMMARY

Certain aspects of the invention generally relate to thermal imaging cameras and method of using the same wherein the user of the camera is prompted to perform certain tasks in response to information from sensors in communication with the camera. In some embodiments, portable handheld thermal imaging cameras comprise an infrared (IR) lens assembly and associated IR sensor for detecting thermal images of a target scene. Cameras may additionaly comprise a display, a processor, and at least one additional sensor aside from the IR sensor configured to provide measurement data to the processor. The additional sensor can be in wired or wireless communication with the camera, and can be any appropriate type of sensor, such as, for example, a current or voltage meter, a temperature sensor, or a positioning sensor. The processor receives and analyzes the measurement data from the additional sensor, and determines if the data satisfies a predetermined requirement. If so, the camera prompts the user via the display.

The prompt can be such that it instructs the user to annotate an image acquired by the camera. Among various embodiments, the annotation can be selected by the user from an existing menu from which the user selects an appropriate annotation. The menu can be in the form of a tree structure, in which the user navigates through a series of options before arriving at an appropriate annotation. Alternatively, the user can compose a custom annotation for the image. Once an image is annotated in response to a prompt triggered by measurement data from the additional sensor, the camera may annotate subsequent images in the same way until instructed not to or the measurement data no longer satisfies the predetermined requirement. Annotations can be stored with the image and be recalled when the captured image is recalled.

The prompt can alternatively or additionally instruct the user to perform a particular task, such as to acquire a thermal image of a specific component, or to ensure the operating condition of a component to be imaged. Various forms of additional sensors can provide a wide range of information from which the camera can initiate a user prompt.

Methods according to the invention comprise methods of prompting a user of a thermal imaging camera to perform a task. Methods can comprise detecting a first parameter with an additional sensor of the camera, comparing the first parameter to a first predetermined requirement, and prompting the user with a first prompt via a display if the first parameter satisfies the first predetermined requirement. Methods can include, for example, prompting the user to annotate a thermal image, or to perform a thermographic inspection. Such or similar methods may additionally be encoded into computer-readable media and carried out by a programmable processor.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. A non-limiting example of such a thermal imaging camera may be found in U.S. Pat. No. 7,535,002, entitled "Camera with visible light and infrared image blending," which is hereby incorporated by reference. Depending on the configuration of the thermal imaging camera, the camera may include infrared optics to focus the infrared radiation on an infrared sensor and visible light optics to focus the visible light on a visible light sensor.

An image of a scene captured by a thermal imaging camera can be displayed on a view screen of the thermal imaging camera or on a screen separate from the thermal imaging camera, as a thermal image, a visible light image, or a blended thermal image and visible light image. Furthermore, a variety of color spectrums may be used to enhance the display of different temperatures shown in the image. However, it can still be difficult to interpret the heat patterns shown in the thermal image. Various embodiments therefore provide animated presentation of the thermal image in order to allow a user to better view and understand the heat patterns shown in the image.

Figure 1:
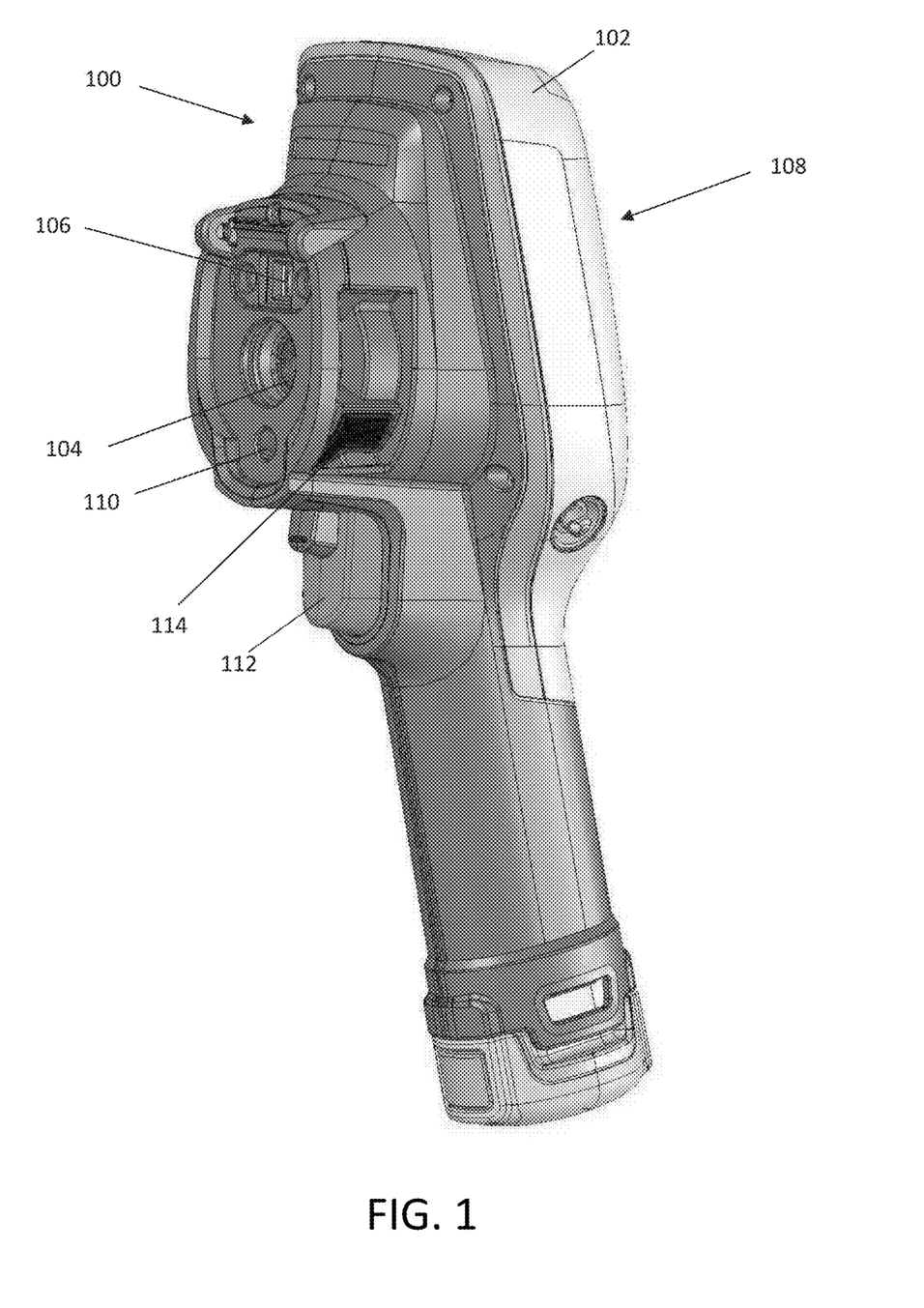
FIG. 1 is a perspective front view of an example thermal imaging camera.
Figure 2:
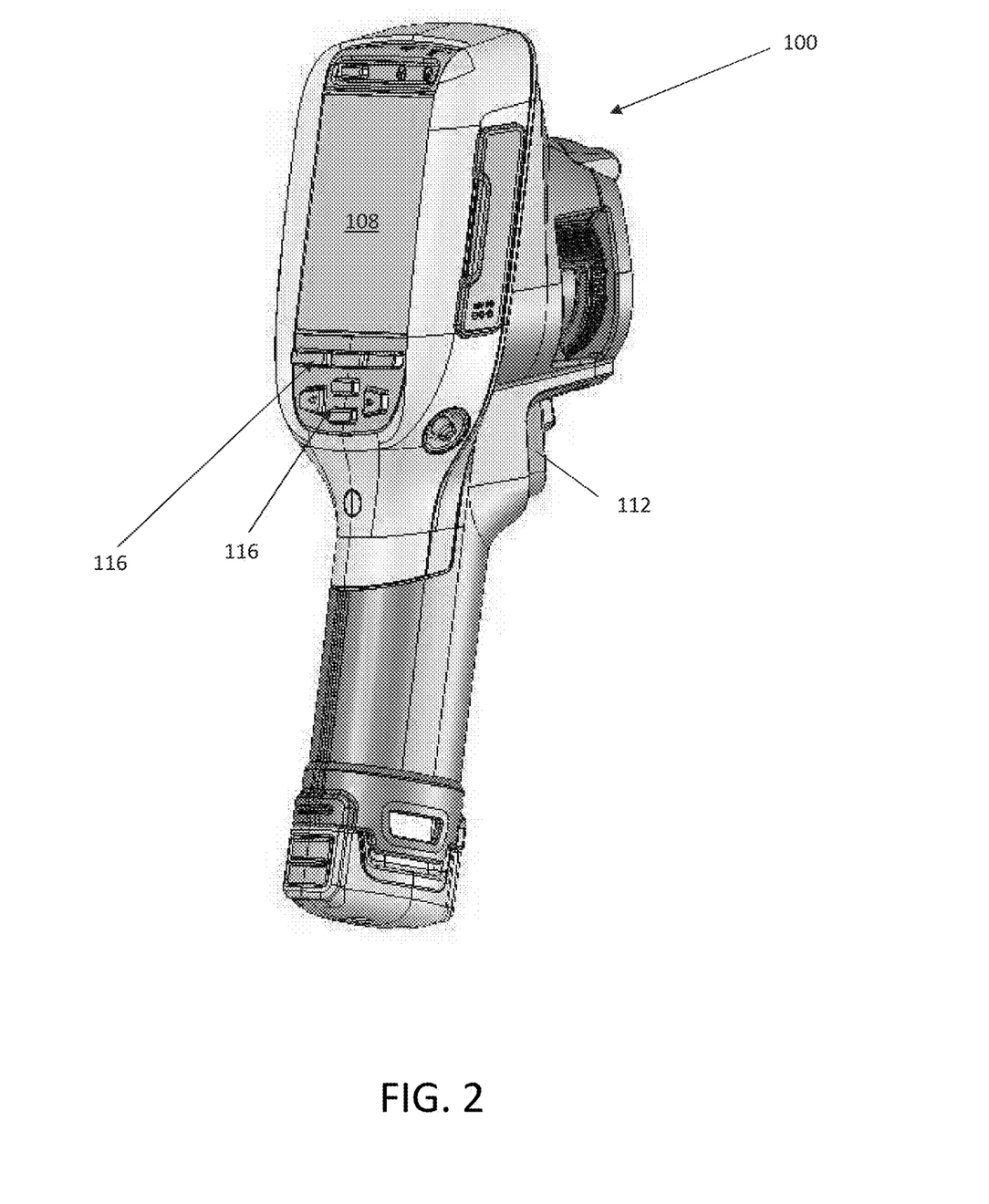
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a composite IR and VL image that is a simultaneous display of the visible light image and the infrared image. In different examples, display 108 may be remote (e.g., separate) from infrared lens assembly 104 and visible light lens assembly 106 of thermal imaging camera 100.

The infrared sensor may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements.

Thermal imaging camera 100 contains a processor (processing circuitry), that may also include memory that stores program instructions and related data that, when executed by the processor, cause thermal imaging camera 100 and the processor to perform many different functions. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, such as an external workstation. The processor (processing circuitry) sends the processed data to a display 108 or other output/control device. Independent of the specific circuitry, thermal imaging camera 100 may be configured to manipulate data representative of a target scene so as to provide an output that can be displayed, stored, transmitted, or otherwise utilized by a user.

The processor may control display 108 to display the visible light image and the infrared image as a composite image. In a composite image, the visible light image and the infrared image may be superimposed on top of one another. An operator may interact with user interface 138 to control the transparency or opaqueness of one or both of the images displayed on display 108. For example, the operator may interact with user interface 138 to adjust the infrared image between being completely transparent and completely opaque and also adjust the visible light image between being completely transparent and completely opaque. Such an example composite image, which may be an alpha-blend of the infrared and visible imagery using a selected blending ratio, may allow an operator to adjust display 108 to display an infrared-only image, a visible light-only image, of any overlapping combination of the two images between the extremes of an infrared-only image and a visible light-only image. The processor may also combine scene information with other data, such as radiometric data, alarm data, and the like.

The operator may receive output from thermal imaging camera 100 via display 108. The processor may control display 108 to display an infrared-image and/or a visible light image in any acceptable palette, or color scheme, and the palette may vary, e.g., in response to user control. In some examples, the processor controls display 108 to display an infrared image in a monochromatic palette such as grayscale or amber. In other examples, display 108 is configured to display an infrared image in a color palette such as, e.g., ironbow, blue-red, or other high contrast color scheme. The combination of grayscale and color palette displays is also contemplated.

Figure 3:
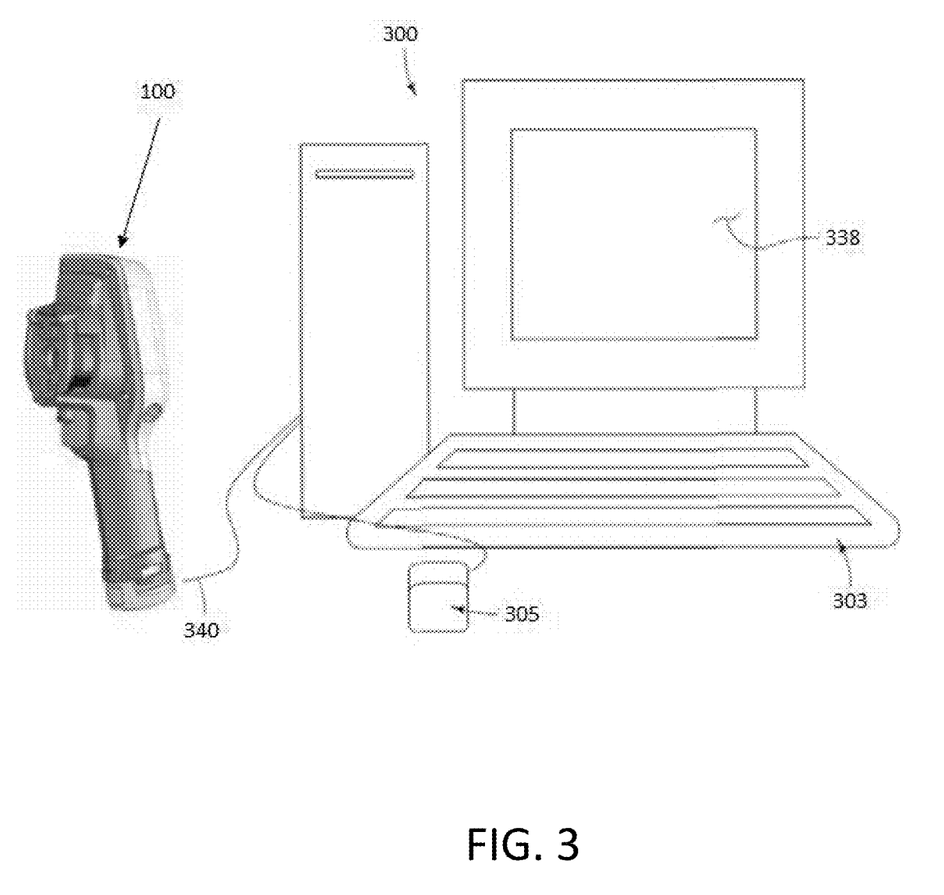
FIG. 3 is a schematic of an example thermal imaging camera connected to a workstation.

As noted above, the processor (processing circuitry) sends the processed data to a display 108 or other output/control device 140. FIG. 3 is a schematic of an exemplary thermal imaging and analysis system, which includes thermal imaging camera 100 connected to another output/control device. In particular, output/control device is workstation 300 in FIG. 3. Many types of workstations 300 may be used, for example, a personal computer, a tablet computer, a smartphone, or other type of computing device on which a thermography software program, adapted for displaying and manipulating data, which is transferred from camera 100, is loaded. In certain embodiments, thermal imaging camera 100 has the capability to display the IR and/or VL images on the workstation 300, via a display 338, for example. In certain embodiments, the data associated with the IR and/or VL images captured by the thermal imaging camera 100 may be transferred to workstation 300. FIG. 3 illustrates a data transfer cord 340 coupling camera 100 to workstation 300, for data transfer therebetween. It should be understood that alternative means, such as wireless communication and/or a plug-in memory card may be employed to transfer the data. With further reference to FIG. 3, workstation 300 is shown including a keyboard 303 and a mouse 305, either of which may be used to manipulate interactive elements of user interfaces of the present invention. Of course, other known types of user interfaces may be used, including a touchscreen or other interactive display screen.

In addition to sensors for receiving radiation to generate an image of the target scene, thermal imaging cameras and/or visible light cameras according to the present invention may be equipped with additional sensors for acquiring a variety of data and adapted to communicate with the camera's processor. Such sensors can generally be either built-in or external to the camera. Exemplary built-in sensors of the camera can include but are not limited to ambient temperature sensors, external light detectors, a compass, accelerometers, microphones, range finders and position sensors, including global and/or indoor positioning systems.

In some embodiments, the camera can comprise a wireless receiver or transceiver in order to wirelessly receive data from one or more external sensors, such as a current clamp, a multimeter, or any other sensor that can produce a readable output and be configured for wireless communication. In some embodiments, the camera detects when data is available from an additional sensor, and establishes wireless communication therewith. The establishment of the wireless communication can occur automatically, or can be instigated by a user. In some embodiments, the camera will alert the user with a prompt that wireless data is available or within range of wireless communication. Wireless communication can include Bluetooth communication or other wireless communication techniques known in the art. In other embodiments of the invention, the camera can interface with external sensors via a wired connection. In still further embodiments, the camera can communicate with external sensors via both wired and wireless connections. Generally, this communication allows for the camera to connect to any of several external sensors in order to receive data therefrom. Moreover, the remote sensor placement allows users to place modules in hazardous or awkward places and then monitor the readings from a safe distance all while acquiring image data. For example, a technician can de-energize an electrical panel, connect voltage or current modules to any of or all three phases, for example, close and re-energize the panel, and then conveniently monitor the measurements while conducting imaging procedures from outside the arc flash zone. Thus, cameras may conveniently and safely acquire data from additional built-in or external sensors independently from, or in some embodiments, in conjunction with, the infrared and/or visible light sensors for capturing thermal and/or visible light images of a target scene. This data can be used to improve functionality and operability of the camera.

Figure 4:
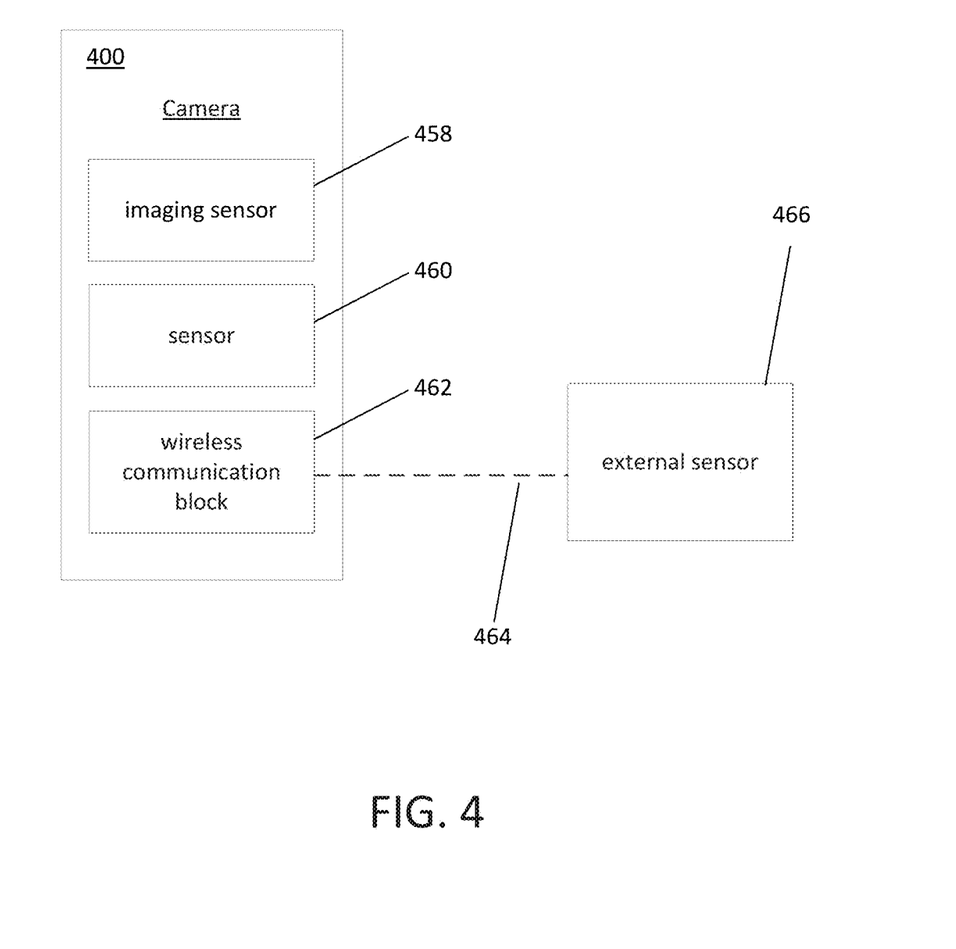
FIG. 4 is a block diagram of an embodiment of a camera.

FIG. 4 is a block diagram of an embodiment of a camera. The camera 400 of FIG. 4 comprises an imaging sensor 458, an internal sensor 460 and a wireless communication block 462. The internal sensor 460 can be any kind of sensor internal to the camera as discussed above. The wireless communication block 462 can be configured to be in wireless communication 464 with an external sensor 466, as illustrated by a broken line. Similarly, the external sensor 466 can be any sensor configured for wireless communication. Thus, in this embodiment, the camera 400 can communicate with internal sensor 460 or external sensor 466 via the wireless communication block 462. In some embodiments, the internal sensor 460 and/or the external sensor 466 communicate with a processor inside the camera 400. Additionally, in various embodiments, cameras may comprise either one or both of internal sensor 460 and wireless communication block 462 to communicate with an external sensor 466. CNXT™ Wireless Test Tools from Fluke Corporation provide exemplary sensors which may be in wireless communication with the camera. For example, components such as the Fluke's CNX i3000 iFlex AC Wireless Current Module, CNX v3000 AC Wireless Voltage Module, CNX a3000 AC Wireless Current Clamp Module, and CNX t3000 K-Type Wireless Temperature Module can each provide wireless sensor information to a camera.

Such additional built-in and external sensors, in addition to the FPA or other such thermal imaging sensors, can be used by the camera to detect changes in the camera's environment or other parameters that might be important or provide useful information associated with any acquired thermal or visible light images. However, the camera may not contain sufficient information to predict, or may not be able to determine, the cause of the sensed change or if any of the additional measured information is important with regard to a captured image. Moreover, a camera user who captured the image for reference may, over the course of time, forget important details about a particular image or why differences appear among a series of like images. left undocumented, important information may be lost or forgotten. This information is likely unrecoverable should the captured images be referenced again in the future.

To help prevent this, the camera can be configured to prompt the user via the display to annotate the acquired image in order to document either an event that has caused a change or some other potentially important information that was detected by the camera's sensors (FPA or additional internal or external sensors). Such a prompt may be initiated by a signal from a sensor satisfying a certain predetermined requirement such as crossing a threshold, detecting a particular location, or reading a substantially zero value (e.g. a reading small enough to be considered zero including noise) at the sensor, for example. The prompt may occur at various times according to embodiments of the invention. For example, the prompt may occur at the time an image is captured, at the time when predetermined requirement was satisfied, after the predetermined requirement has been satisfied for a certain length of time, etc. In some embodiments, the timing of the prompt may be selected by the user.

Figure 5:
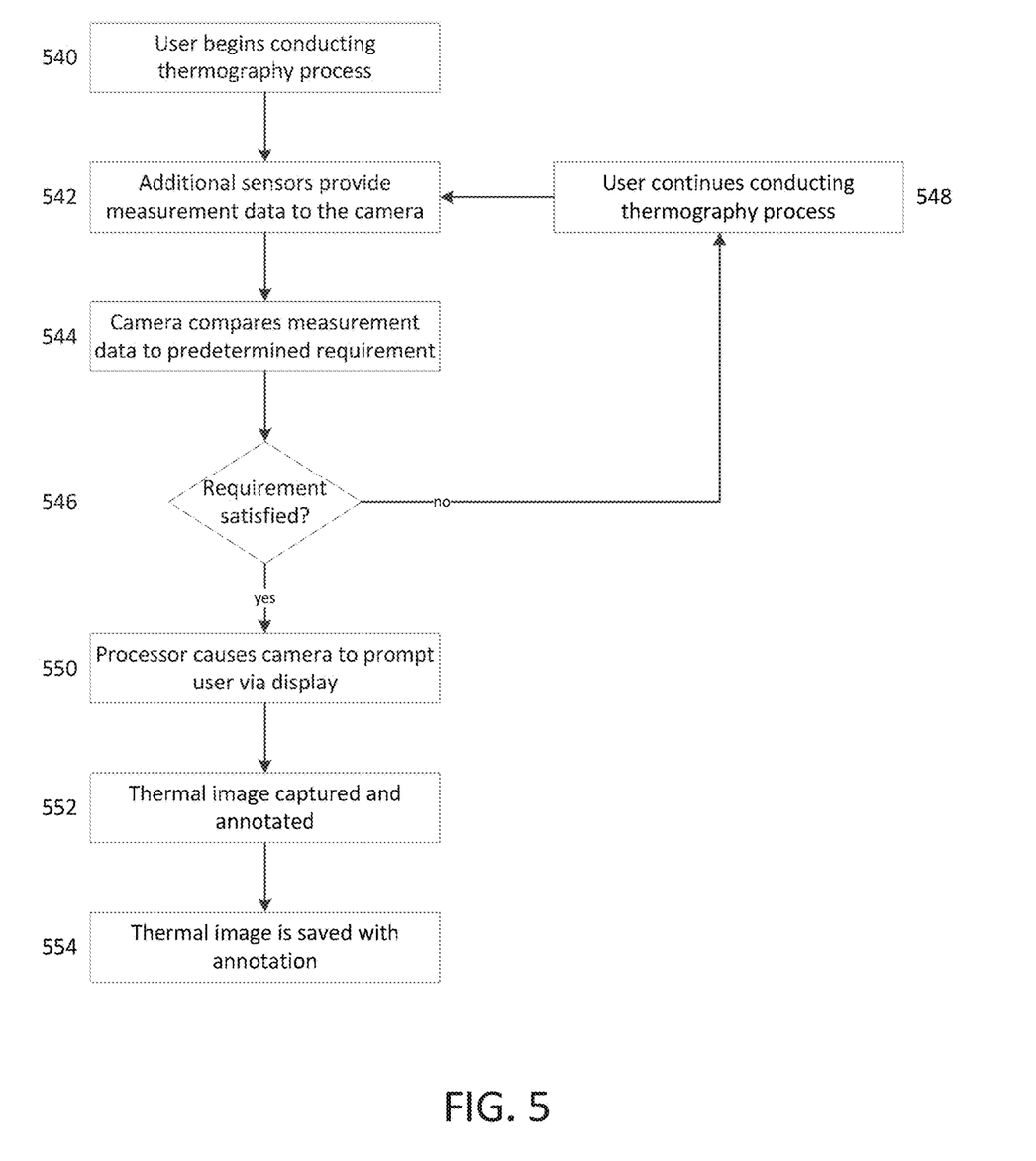
FIG. 5 is a process-flow diagram outlining the process of prompting a user according to certain embodiments of the present invention

FIG. 5 is a process-flow diagram outlining a process of prompting a user with a camera comprising at least one additional (e.g., non-IR-imaging) sensor according to certain embodiments. First, a user begins 540 conducting a thermography process using a thermal imaging camera. Next, one or more additional sensors provide 542 measurement data to the camera. The camera compares 544 the measurement data to a predetermined requirement associated with the data being measured. Such comparison may be done via the processor, for example. If the predetermined requirement is not satisfied 546, the user continues 548 to conduct the thermography process. If the predetermined requirement is satisfied 546, however, the processor causes the camera to prompt 550 the user via the display. As described, the camera may prompt the user to annotate the image to document a detected change in the thermal image or surrounding area, so that a thermal image may be captured and annotated 552. In some possible configurations, when a signal satisfies a predetermined requirement, initiating a prompt that leads to the user annotating a captured image, the same annotation may be automatically applied to subsequent images until the prompt-inducing signal no longer meets the predetermined requirement, or until the user manually disables the annotation. After a thermal image is captured and annotated 552, the camera can save 554 the annotated image so that the thermal scene and annotation are kept together for future reference. The annotation data may be associated with the image in ways known in the art, such as adding comment data to an image file. File types can comprise any appropriate type known in the art, including a fully radiometric format, such as .is2 or .is3.

Further, upon detection of a met predetermined requirement, the camera may alternatively or additionally prompt the user to further examine the environment for the source of a detected change or an unexpected measurement, such as a malfunctioning piece of equipment. The camera may also prompt the user to make a particular measurement or acquire a particular image based upon signals received from the sensors. Exemplary scenarios utilizing various possible features of camera embodiments are described briefly below:

EXAMPLE 1

A camera comprises a position sensor, such as a GPS or other such apparatus, which sends signals to the camera indicating that it is in a particular location. In response, the camera prompts the user to make a particular measurement associated with that location.

EXAMPLE 2

A thermal imaging camera comprises a thermocouple configured to measure the ambient temperature of camera's surroundings. If the camera detects a significant change in temperature via the thermocouple, it prompts the user to note the reason for the detected temperature change. For example, the camera user may have changed from being indoors to outdoors or vice versa to acquire additional thermal scenes. The camera can prompt the user to make note of the change by annotating acquired images so that the appropriate location can be associated with the appropriate images.

EXAMPLE 3

A thermal imaging camera comprises a wireless communication link to multiple current clamps measuring the current through multiple points to be analyzed in a thermal scene. The camera can detect the measured currents and prompt the user to annotate the thermal image to associate the appropriate measurement with the appropriate location in the scene.

EXAMPLE 4

A camera comprises a sensor for detecting the presence or absence of a lens attached thereto. The camera detects the attachment of a lens (transition from absence to presence of a lens) and prompts the user to indicate the type of lens that has been attached. Subsequent images can be annotated with the lens type.

EXAMPLE 5

A thermal imaging camera comprises a communication link to a current clamp for measuring current through an electrical device that is to be imaged while operating. The current clamp measures zero current, so the camera prompts the user to check the operational status of the device.

EXAMPLE 6

A thermal imaging camera detects the presence of, and acquires readings from, one or more wireless current clamps within an operable communication range. The camera prompts the user to add descriptive annotation information for each current clamp. For example, in response to a prompt, the user may annotate the image to read "Clamp 1—Motor Phase 1," indicating that the first current clamp is measuring current through the first phase of a motor.

EXAMPLE 7

A thermal imaging camera detects a temperature that is higher than expected for a known thermal imaging application and alerts the user of the abnormal temperature.

Annotations of images can be in response to prompts or can be initiated manually according to certain embodiments of the invention. In the case where a camera prompts the user to annotate an image, in some embodiments, the camera provides the user a list of predetermined annotations to select from. The annotations may be directly selectable from a list, or may be navigated to in, for example, a tree structure which asks the user a series of questions or to make a series of selections to determine an appropriate annotation. In addition, the user may elect to not annotate the image, or may choose to create a custom annotation separate from those offered or suggested by the camera. Example prompts are shown in FIGS. 6-8.

Figure 6:
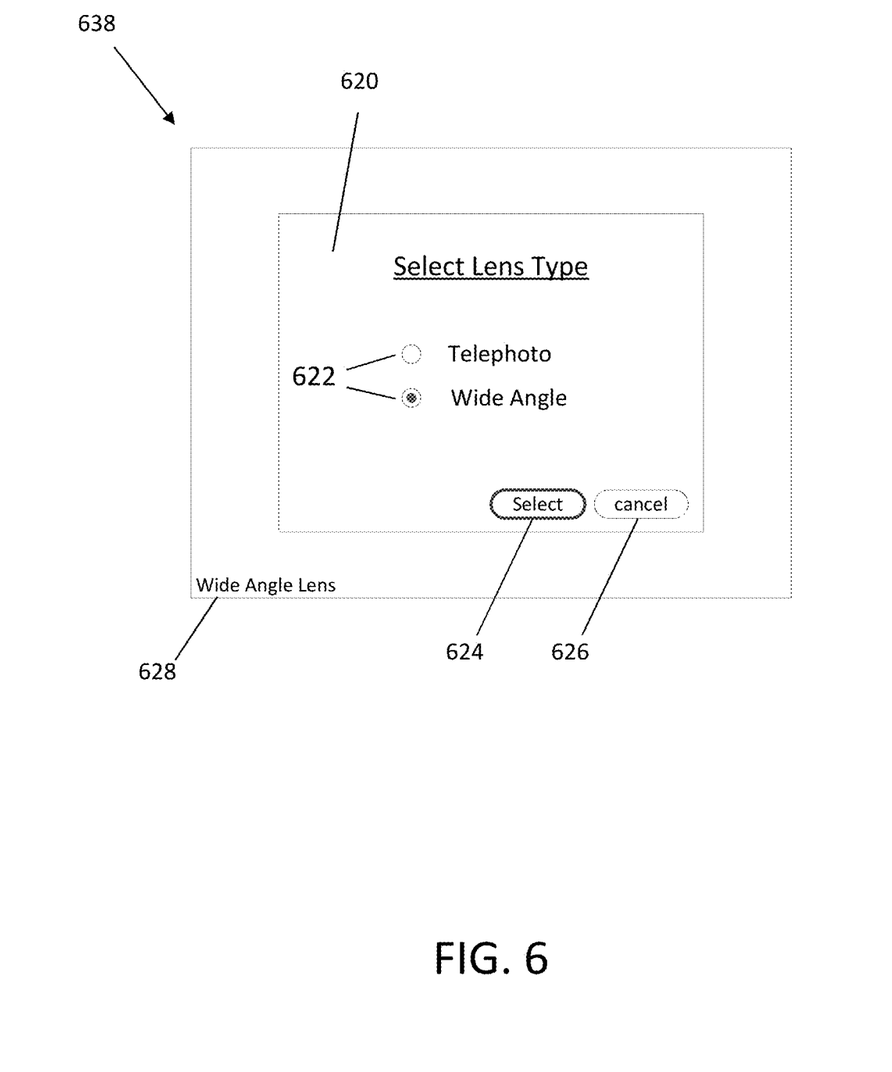
FIG. 6 is an exemplary prompt that the user of a thermal imaging camera may experience.

FIG. 6 is an exemplary prompt that the user of a thermal imaging camera may experience. FIG. 6 shows a view of the display 638 of a thermal imaging camera in accordance with Example 4 above. On the display 638, a prompt window 620 is visible asking the user to select a lens type. Such a prompt may appear, for example, when the camera detects that an accessory lens has been attached (e.g. a transition from detecting no accessory lens attached to detecting an attached accessory lens). Two selections, "Wide Angle" and "Telephoto," are shown with a selection buttons 622 next to each. In some embodiments, the camera display 638 comprises a touch screen, wherein the user may touch the appropriate lens type to select the applicable lens. In other embodiments, a selection may be made via a cursor controlled by, for example, a mouse, keyboard, or other user interface. Once the appropriate selection button 622 is highlighted, the user may actuate the Select button 624 with the user interface in order to choose the selected option. Actuating the Select button 624 may be done in a manner similar to making selections, utilizing, for example, a touch screen, mouse, keyboard, or any other user interface.

Once a selection has been made, an annotation 628 may appear on the screen, shown here displaying the highlighted selection and annotating the thermal scene. While shown here in the lower-left corner of the display 638, it should be appreciated that the annotation 628 may appear anywhere in the image. In some embodiments, the location of the annotation 628 is selectable by the user. It should also be appreciated that in some embodiments, the annotation 628 may not appear until after the Select button 624 has been actuated. Among various embodiments, the cancel button 626 may be used to elect to not annotate the image, to indicate that the annotation displayed prior to the prompt is acceptable and a new one need not be selected, or to perform another function.

Figure 7:
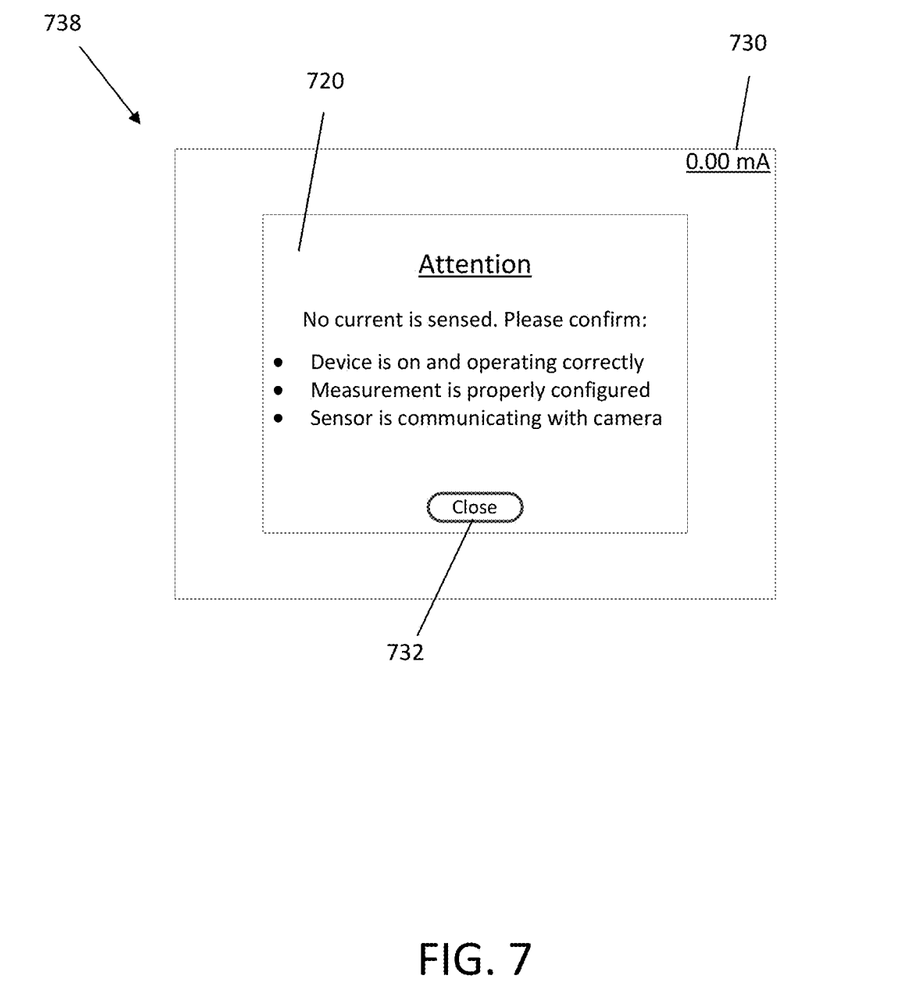
FIG. 7 is another exemplary prompt that the user of a thermal imaging camera may experience.
Figure 8A:
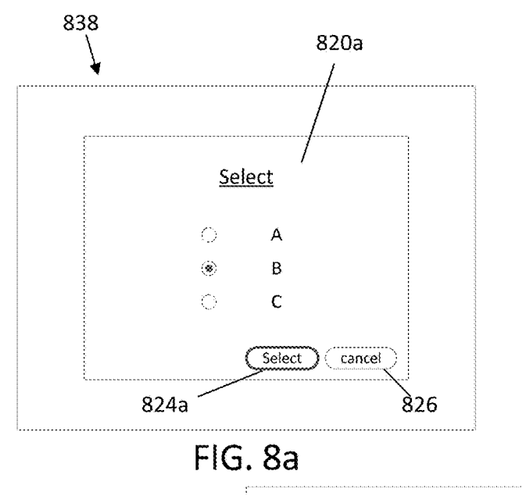
FIGS. 8a-8c show a generic tree structure of prompts according to an embodiment of the present invention.
Figure 8B:
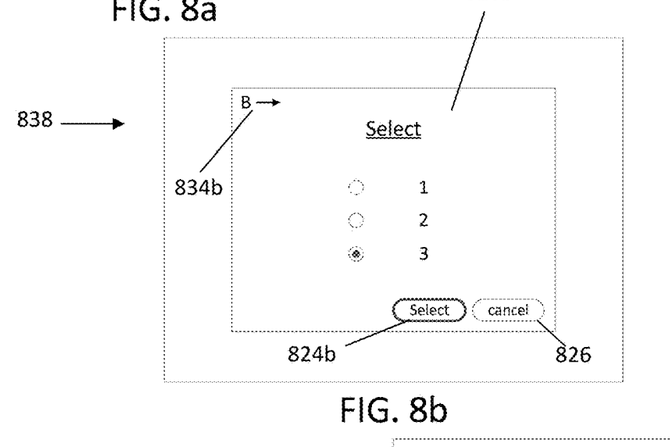
Figure 8C:
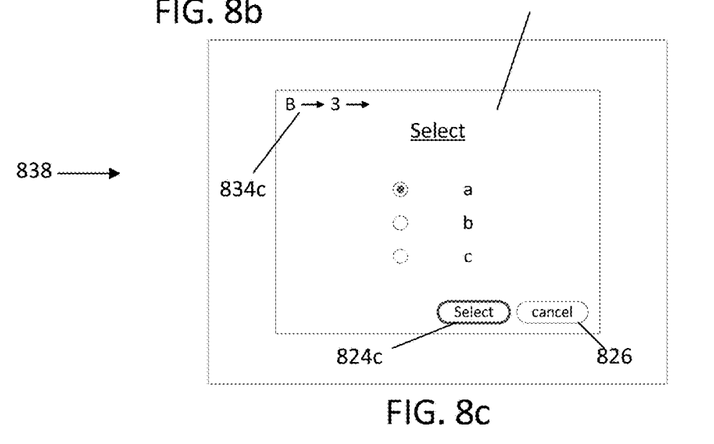

FIG. 7 is another exemplary prompt that the user of a thermal imaging camera may experience. FIG. 7 shows a view of the display 738 of a thermal imaging camera in accordance with Example 5 above. On the display, a prompt window 720 is visible alerting the user of a possible configuration error. In the arrangement associated with FIG. 7, the camera is configured to be in communication with some sort of current measuring device, such as a current clamp. In an exemplary application, the camera can be configured to capture a thermal image of an electrical device during operation. The camera can additionally be configured to record at least one current measurement, with a measurement display 730 shown in the upper-right corner of the display 738. As can be seen, the current measuring device is measuring no current.

If the camera is configured to capture a thermal image of an electrical device during operation and the measurement is reading no current, the camera can alert the user with prompt 720 on the display 738. Prompt 720 alerts the user that there is no sensed current flowing and provides the user with a list of possible causes, such as the device not being on or running, the measurement being configured improperly, or the current measuring device not communicating properly with the camera. Thus, prompt 720 both alerts the user of a potential discrepancy between the desired and observed thermal scene and suggests to the user possible causes of this discrepancy. Once done reviewing and responding to the prompt 720, the user may close the prompt 720 by actuating the Close button 732 by any such means as described above.

FIGS. 8a-8c show a generic tree structure of prompts according to an embodiment of the present invention. With regard to FIG. 8a, the camera prompts the user with prompt 820a via the display 838 in response to a sensed parameter, such as from one or more of the additional sensors. The prompt 820a asks the user to select one of options A, B and C. Such selectable options may be options to describe a currently observable parameter, describe the current state of the target scene or surroundings, select which action the user will take next, or any other relevant multiple choice question. Once the user has highlighted or selected the appropriate selection using any user interface means described previously, the user may actuate the Select button 824a, selecting option B in the case shown in FIG. 8a. In some embodiments, the selection of option B from prompt 820a causes the camera to next display prompt 820b on the display 838 as shown in FIG. 8b, giving the user a new set of options based upon the previous selection. In this case, options 1, 2 and 3 are now available for selection. In some embodiments, the prompt 820b comprises a navigation indicator 834 which reminds or informs the user of the navigation path that has been followed to the present prompt.

In FIG. 8b, the user has highlighted or selected option 3. Upon actuating the Select button 824b, some embodiments of the camera next display prompt 820c on the display 838 as shown in FIG. 8c, providing the user with yet another set of options dependent upon the previous selections through the tree structure, in this case options a, b and c. As can be seen by the navigation indicator 834c, these particular options are available after selecting B and 3 in previous navigation prompts 820a and 820b. In FIG. 8c, the user has selected option a, and upon actuating the Select button 824c, will have navigated through the tree structure to B→3→a.

Depending on the selections of the user and the embodiment of the camera, any number of subsequent prompts can be available and navigated through. In some embodiments, the user can actuate the cancel button 826 in any of the prompts 820 in order to cancel the camera's navigation through the tree structure. If canceled, in some embodiments, the prompts may become temporarily disabled until enabled again by the user. In alternative embodiments, the cancel button 826 navigates backwards one step through the tree structure. In some embodiments, the user may select which action actuating the cancel button 826 initiates. Other methods for navigating backwards through the tree structure, such as a Back button, or for entirely canceling the prompts, such as a Close button or an 'X' button, can also be included in various embodiments.

Embodiments of cameras according to the present invention can comprise any combination of available sensors to enable certain measurements or combinations of measurements. Combinations can comprise entirely built-in, entirely external, or a combination of built-in and external sensors. Accordingly, the camera can detect several types of data simultaneously, and likewise may frequently prompt the user during camera operation. In some embodiments, multiple prompts may each be triggered by multiple sensors, each operating independently and detecting a parameter satisfying its own associated predetermined requirement.

Excessive prompts, however, may be a nuisance to the operator, especially if some of them are unimportant for the current task of the camera operator. As such, according to some embodiments of the invention, certain sensors and/or prompts may be disabled or deactivated by the user in order to inhibit unwanted prompts from interrupting camera operation. Further, in some embodiments, the user may enable automatic annotations, wherein the camera may automatically annotate images based upon desired measurements from built-in or external sensors.

Cameras, according to some embodiments, can comprise a default mode of operation, wherein a certain set of sensors and prompts are active at camera start-up. The particular default prompts enabled at start-up may be configurable by the user according to some embodiments of the invention. Certain embodiments of the camera allow the user to select which prompts are enabled during operation as well. For example, if a user plans to image an electrical device through which current flows, such as in Example 5 above, the user can enable only prompts that relate to current clamps measuring the current through the device, such as the prompt 720 exemplified in FIG. 7. The user can then otherwise disable prompts that may have been triggered by other sensors such as a GPS or an external temperature sensor. In general, specific sets of prompts can be enabled as a group or template of prompts for particular applications in some embodiments. That is, in some embodiments, predefined applications are selectable which will enable a particular set of prompts and/or sensors according to the selected application while disabling all prompts and/or sensor unrelated to the particular application.

In certain embodiments, the enabling and disabling of prompts and/or sensors can be done during operation by the user via the camera's user interface. In some embodiments, the camera may interface with an external computer or workstation 300, such as the one shown in FIG. 3, in order to customize the camera's operation. Among various embodiments of the invention, the camera can interface with the computer or workstation 300 via a wireless connection, a wired connection, or optionally either a wireless or wired connection. From the computer or workstation 300, select prompts may be enabled or disabled and annotations may be customized and/or loaded onto the camera for selection during operation. In some embodiments, selectable lists or menu structures for annotations and/or series of prompts may be customized on the workstation as well.

In an exemplary application, a supervisor or more experienced camera operator can load a particular set of prompts and selectable annotations into the camera from an external workstation, such as workstation 300. Such embodiments are useful to pre-configure a camera before it is used by a less experienced camera operator and can assist the less experience camera operator through a particular procedure. In such a case, during operation, the camera can detect certain information about its surroundings based on its sensors and prompt the inexperienced operator to perform an appropriate task or annotate a captured image adequately and accurately. In this case, because the prompts are not user-initiated, but rather are triggered in response to measurements/detections made by the camera, an inexperienced user can effectively complete complicated or unfamiliar tasks with only the aid of the camera.

It should be appreciated that components described with regard to particular embodiments of the invention may be combined to form additional embodiments. Example cameras and related techniques have been described. The techniques described in this disclosure may also be embodied in or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. A portable, hand-held thermal imaging camera comprising:
an infrared (IR) lens assembly having an associated IR sensor for detecting thermal images of a target scene;
a display associated with a user interface;
a processor; and
at least one additional, non-IR sensor, the additional sensor configured to provide measurement data to the processor, the processor analyzing whether the measurement data satisfies a predetermined requirement, and as a result of the measurement data satisfying the predetermined requirement the processor causing a prompt window to appear on the display, the prompt window providing content related to the measurement data, and
wherein the camera is configured to receive annotation data related to the measurement data satisfying the predetermined requirement from the user at the prompt window, via the user interface, and remove the prompt window from the display upon receiving annotation data from the user.

2. The camera of claim 1, wherein the at least one additional sensor is external to the camera.

3. The camera of claim 2, wherein the at least one additional sensor is in wireless communication with the camera.

4. The camera of claim 3, wherein the camera detects that data is available from the additional sensor, and establishes wireless communication therewith.

5. The camera of claim 4, wherein upon detecting that data is available from the additional sensor, the camera alerts the user via a prompt that wireless data is available.

6. The camera of claim 3, wherein the at least one additional sensor in wireless communication with the camera comprises at least one of a voltage and a current measuring device.

7. The camera of claim 3, wherein the camera is in wireless communication with a plurality of additional sensors.

8. The camera of claim 1, wherein, if the user applies an annotation to the image, the annotation is automatically applied to subsequent images.

9. The camera of claim 1, wherein the annotation is selectable by the user from a menu presented in the prompt window.

10. The camera of claim 9, wherein the menu comprises a tree structure.

11. The camera of claim 1, further configured to:
store the annotation data in association with a captured image such that the received annotation data may be recalled when the captured image is recalled.

12. The camera of claim 1, wherein the prompt window further instructs the user to perform a particular task.

13. The camera of claim 1, wherein the display presents a captured thermal image of the target scene, and wherein the prompt window appears at a location on the display over the captured thermal image.

14. A non-transitory computer-readable medium containing executable instructions causing one or more processors to perform a method to prompt a user of a thermal imaging camera to perform an action, the method comprising:
receiving a first signal from a first sensor, the first sensor being a non-imaging sensor;
determining if the first signal satisfies a first predetermined requirement;
generating a prompt window on a display of the thermal imaging camera as a result of the first signal satisfying the first predetermined requirement, wherein the prompt window provides content related to the first signal and directs the user to perform an action comprising providing annotation data related to the first signal satisfying the first predetermined requirement to the camera at the prompt window; and
closing the prompt window on the display upon receiving annotation data from the user.

15. The computer readable medium of claim 14, wherein generating the prompt window on the display occurs only after an image is acquired.

16. The computer readable medium of claim 14, wherein the annotation data is selectable from a predetermined list of annotations.

17. The computer readable medium of claim 16, wherein the predetermined list of annotations comprises a tree structure through which the user can navigate.

18. The computer readable medium of claim 14, further configured to associate the annotation data to an acquired thermal image such that the annotation data may be recalled when the captured image is recalled.

19. The computer readable medium of claim 14, wherein the first sensor is an additional, non-imaging sensor selectable by the user.

20. The computer readable medium of claim 14, wherein generating the prompt window on the display comprises prompting the user to dnter content related to the first signal via a user interface in response to the prompt window on the display.

21. A method for prompting a user of a thermal imaging camera to perform a task, the method comprising:
   providing a thermal imaging camera comprising
      a processor,
      an infrared (IR) lens assembly,
      an IR sensor,
      a first additional sensor, and
      a display;
   detecting, with the first additional sensor, a first parameter;
   comparing the first parameter to a first predetermined requirement with the processor; and
   generating a first prompt window to the user on the display as a result of the first parameter satisfying the first predetermined requirement, wherein the first prompt window provides content related to the first parameter and prompts the user to annotate a thermal image with content related to the first parameter satisfying the first predetermined requirement.

22. The method of claim 21, wherein the first prompt window is generated only when an image is acquired.

23. The method of claim 21, wherein
   the thermal imaging camera further comprises a second additional sensor; and the method further comprises
   detecting a second parameter with the second additional sensor;
   comparing the second parameter to a second predetermined requirement; and
   generating a second prompt window on the display as a result of the second parameter satisfying the second predetermined requirement, wherein the second prompt window provides content related to the second parameter.

24. The method of claim 21, further comprising the step of performing a thermographic inspection.

25. The method of claim 21, further comprising the step of entering content related to the first parameter via a user interface in response to the prompt window.

26. The method of claim 25, further comprising the step of receiving content from the user and storing the received content in association with an image captured by the camera such that the received content may be recalled when the captured image is recalled.

27. The method of claim 25, wherein the content provides an annotation to an image captured by the camera.

* * * * *